(12) United States Patent
Blonde et al.

(10) Patent No.: US 11,092,820 B2
(45) Date of Patent: Aug. 17, 2021

(54) APPARATUS AND A METHOD FOR GENERATING DATA REPRESENTATIVE OF A PIXEL BEAM

(71) Applicant: INTERDIGITAL CE PATENT HOLDINGS, Paris (FR)

(72) Inventors: Laurent Blonde, Cesson-Sevigne (FR); Arno Schubert, Cesson-Sevigne (FR); Guillaume Boisson, Cesson-Sevigne (FR); Didier Doyen, Cesson-Sevigne (FR); Paul Kerbiriou, Cesson-Sevigne (FR); Olivier Bureller, Cesson-Sevigne (FR); Valter Drazic, Cesson-Sevigne (FR)

(73) Assignee: INTERDIGITAL CE PATENT HOLDINGS, Paris (FR)

( * ) Notice: Subject to any disclaimer, the term of this patent is extended or adjusted under 35 U.S.C. 154(b) by 0 days.

(21) Appl. No.: 16/313,418

(22) PCT Filed: Jun. 30, 2017

(86) PCT No.: PCT/EP2017/066359
§ 371 (c)(1),
(2) Date: Dec. 26, 2018

(87) PCT Pub. No.: WO2018/002346
PCT Pub. Date: Jan. 4, 2018

(65) Prior Publication Data
US 2019/0162978 A1    May 30, 2019

(30) Foreign Application Priority Data
Jun. 30, 2016  (EP) .................................... 16305810

(51) Int. Cl.
*G02B 30/50* (2020.01)
*H04N 13/243* (2018.01)
(Continued)

(52) U.S. Cl.
CPC ............ *G02B 30/50* (2020.01); *G02B 30/27* (2020.01); *G06T 15/506* (2013.01); *H04N 13/106* (2018.05); *H04N 13/243* (2018.05)

(58) Field of Classification Search
None
See application file for complete search history.

(56) References Cited

U.S. PATENT DOCUMENTS

| 7,723,662 B2* | 5/2010 | Levoy | G02B 21/361 250/208.1 |
| 7,936,392 B2* | 5/2011 | Ng | G02B 3/0056 348/349 |

(Continued)

FOREIGN PATENT DOCUMENTS

| CN | 101419708 | 9/2010 |
| CN | 203219392 | 9/2013 |

(Continued)

OTHER PUBLICATIONS

Levoy etal.—"Light field rendering"—Computer Graphics Proceedings. SIGGRAPH'96, ACM, New York, US—Aug. 1, 1996 (Aug. 1, 1996), pp. 31-42, XP058220079, DOI: 10.1145/237170.237199—ISBN: 978-0-89791-746-9—2-3 ; 5.

(Continued)

*Primary Examiner* — Fernando Alcon
(74) *Attorney, Agent, or Firm* — Lily Neff

(57) ABSTRACT

There are several types of plenoptic devices having their proprietary file format. At present there is no standard supporting the acquisition and transmission of multidimensional information for an exhaustive over-view of the different parameters upon which a light-field depends. As such acquired light-field data for different cameras have a diversity of formats. The notion of pixel beam, which represents a volume occupied by a set of rays of light in an object space of an optical system of a camera is thus introduced. The (Continued)

method according to the invention enables to provide data representative of a collection of pixel beams describing a first optical system that is agnostic since these data are obtained by imaging the collection of pixel beams through a second optical system. Such data representative of a collection of pixel beams enable the generation of parametrized output images from which post-processing.

22 Claims, 5 Drawing Sheets

(51) Int. Cl.
*H04N 13/106* (2018.01)
*G02B 30/27* (2020.01)
*G06T 15/50* (2011.01)

(56) References Cited

U.S. PATENT DOCUMENTS

| | | | | |
|---|---|---|---|---|
| 8,279,325 | B2* | 10/2012 | Pitts | H04N 5/23212 348/345 |
| 8,289,440 | B2* | 10/2012 | Knight | H04N 5/2254 348/349 |
| 8,358,354 | B2* | 1/2013 | Ng | H04N 9/646 348/222.1 |
| 9,247,222 | B2 | 1/2016 | Sieler et al. | |
| 10,552,947 | B2* | 2/2020 | Liang | G06T 7/194 |
| 2002/0008917 | A1* | 1/2002 | Daniell | G02B 30/27 359/622 |
| 2013/0002827 | A1 | 1/2013 | Lee et al. | |
| 2013/0107003 | A1 | 5/2013 | Lim et al. | |
| 2013/0107085 | A1 | 5/2013 | Ng et al. | |
| 2013/0222606 | A1* | 8/2013 | Pitts | H04N 5/2254 348/187 |
| 2013/0321581 | A1 | 12/2013 | El-Ghoroury et al. | |
| 2013/0321589 | A1 | 12/2013 | Kirk et al. | |
| 2014/0292620 | A1 | 10/2014 | Lapstun | |

FOREIGN PATENT DOCUMENTS

| | | | | |
|---|---|---|---|---|
| EP | 3023826 | | 5/2016 | |
| KR | 20130019080 | | 2/2013 | |
| KR | 20130047194 | | 5/2013 | |
| RU | 2587502 | C2 | 6/2016 | |
| WO | WO-9849667 | A3 * | 2/1999 | G06T 17/00 |

OTHER PUBLICATIONS

Fehn etal.—"Depth-image-based rendering (DIBR), compression, and transmission for a new approach on 3D-TV"—Proceedings of the International Society for Optical Engineering (SPIE), vol. 5291, n° 2—May 31, 2004 (May 31, 2004), pp. 93-104, XP008154309, DOI: 10.1117/12.524762—3.1.

Hartley etal.—"Multiple view geometry"—Jun. 1, 1999 (Jun. 1, 1999)—XP055016812—retrieved from the Internet: URL:http://users.rsise.anu.edu.au/hartley/public_html/Papers/CVPR99-tutorial/tut_4up.pdf [retrieved on Jan. 18, 2012]—p. 1-p. 2.

McMillan etal.—"Plenoptic modeling: an image-based rendering system"—Proceedings SIGGRAPH '95, Proceedings of the 22nd annual conference on Computer graphics and interactive techniques, Los Angeles, California—Aug. 6-11, 1995—pp. 39-46—ACM.

Hahne etal.—"Baseline of virtual cameras acquired by a standard plenoptic camera setup", 2014 3DTV-Conference: The True Vision—Capture, Transmission and Display of 3D Video (3DTV-CON 2014), Jul. 2-4, 2014, IEEE.

Vaish etal.—"Using plane + parallax for calibrating dense camera arrays", Proceedings of the 2004 IEEE Computer Society Conference on Computer Vision and Pattern Recognition, Jun. 27-Jul. 2, 2004, IEEE.

Levoy etal.—Synthetic aperture confocal imaging ACM Transactions on Graphics (TOG)—Proceedings of ACM SIGGRAPH 2004—vol. 23, Issue 3, Aug. 2004—pp. 825-834.

Ma etal.—"Unstructured Synthetic Aperture Photograph Based Occluded Object Imaging", 2013 Seventh International Conference on Image and Graphics (ICIG), Jul. 26-28, 2013—IEEE.

Truscott etal.—"Determining 3D Flow Fields via Multi-camera Light Field Imaging", Journal of Visualized Experiments | vol. 73 | e4325 (10 pp.), MyJoVE Corp, Mar. 2013.

Nakatsuji etal.—"Free-viewpoint images captured using phase-shifting synthetic aperture digital holography"—Applied Optics, vol. 47, Issue 19, pp. D136-D143, Optical Society of America, Jul. 1, 2008.

Levin etal.—"Understanding camera trade-offs through a Bayesian analysis of light field projections"—Computer Vision—ECCV 2008—vol. 5305 of the series Lecture Notes in Computer Science—Proceedings of the 10th European Conference on Computer Vision: Part IV—pp. 88-101—Oct. 12-18, 2008.

Park et al., "Light ray field capture using focal plane sweeping and its optical reconstruction using 3D displays", Optics Express, vol. 22, No. 21, pp. 25444-25454, in Oct. 2014.

Ren Ng, "Digital Light Field Photography", Doctoral dissertation submitted to the Department of Computer Science and the Committee on graduate studies of Stanford University, Jul. 2006.

Wanner etal.—"Generating EPI Representations of 4D Light Fields with a Single Lens Focused Plenoptic Camera"—Advances in Visual Computing—7th International Symposium, ISVC 2011—vol. 6938 of the series Lecture Notes in Computer Science—pp. 90-101—Sep. 26-28, 2011.

http://cameramaker.se/plenoptic.htm (see "The unprocessed light field image" and "Detail of the light field image"), retrieved Jan. 15, 2016.

International Search Report for PCT/EP2017/066359 dated Oct. 5, 2017.

European Search Report for EP16305810.0 dated Dec. 7, 2016.

Anglin, P. et al., "Efficient volumetric estimation from plenoptic data," SPIE—The International Society for Optical Engineering Source: Proceedings of the SPIE—The International Society for Optical Engineering, vol. 9020, 11 pp. 2014.

* cited by examiner

APPARATUS AND A METHOD FOR GENERATING DATA REPRESENTATIVE OF A PIXEL BEAM

This application claims the benefit, under 35 U.S.C. § 365 of International Application PCT/EP17/066359, filed Jun. 30, 2017, which was published in accordance with PCT Article 21(2) on Jan. 4, 2018 in English and which claims the benefit of European Patent Application 16305810.0 filed Jun. 30, 2016.

TECHNICAL FIELD

The present invention relates to generation of data representing a light field.

BACKGROUND

The acquisition of four-dimensional or 4D light-field data, which can be viewed as a sampling of a 4D light field, i.e. the recording of light rays, is explained in the article "*Understanding camera trade-offs through a Bayesian analysis of light field projections*" by Anat Levin and al., published in the conference proceedings of ECCV 2008 is an hectic research subject.

Compared to classical two-dimensional or 2D images obtained from a camera, 4D light-field data enable a user to have access to more post-processing features that enhance the rendering of images and the interactivity with the user. For example, with 4D light-field data, it is possible to perform refocusing of images with freely selected distances of focalization meaning that the position of a focal plane can be specified/selected a posteriori, as well as changing slightly the point of view in the scene of an image. In order to acquire 4D light-field data, several techniques can be used. For example, a plenoptic camera is able to acquire 4D light-field data. A plenoptic camera comprises a main lens, a microlens array comprising a plurality of micro-lenses arranged in a two-dimensional array and an image sensor. Another way to acquire 4D light-field data is to use a camera array which comprises a lens array and an image sensor.

In the example of the plenoptic camera, the main lens receives light from an object in an object field of the main lens and passes the light through an image field of the main lens.

At last, another way of acquiring a 4D light field is to use a conventional camera that is configured to capture a sequence of 2D images of a same scene at different focal planes. For example, the technique described in the document "*Light ray field capture using focal plane sweeping and its optical reconstruction using 3D displays*" by J.-H. Park et al., published in OPTICS EXPRESS, Vol. 22, No. 21, in October 2014, may be used to achieve the acquisition of 4D light field data by means of a conventional camera.

There are several ways to represent 4D light-field data. Indeed, in the Chapter 3.3 of the Ph. D dissertation thesis entitled "*Digital Light Field Photography*" by Ren Ng, published in July 2006, three different ways to represent 4D light-field data are described. Firstly, 4D light-field data can be represented, when recorded by a plenoptic camera by a collection of micro-lens images. 4D light-field data in this representation are named raw images or raw 4D light-field data. Secondly, 4D light-field data can be represented, either when recorded by a plenoptic camera or by a camera array, by a set of sub-aperture images. A sub-aperture image corresponds to a captured image of a scene from a point of view, the point of view being slightly different between two sub-aperture images. These sub-aperture images give information about the parallax and depth of the imaged scene. Thirdly, 4D light-field data can be represented by a set of epipolar images see for example the article entitled: "*Generating EPI Representation of a 4D Light Fields with a Single Lens Focused Plenoptic Camera*", by S. Wanner and al., published in the conference proceedings of ISVC 2011.

Light-field acquisition devices are extremely heterogeneous. Light-field cameras are of different types for example plenoptic or camera arrays. Within each type there are many differences such as different optical arrangements, or micro-lenses of different focal lengths. Each camera has its own proprietary file format. At present here is no standard supporting the acquisition and transmission of multi-dimensional information for an exhaustive over-view of the different parameters upon which a light-field depends. As such acquired light-field data for different cameras have a diversity of formats.

The present invention has been devised with the foregoing in mind.

SUMMARY OF INVENTION

According to a first aspect of the invention there is provided a computer implemented method for generating data representative of a volume occupied by a set of rays of light passing through a pupil of an optical system, said volume occupied by said set of rays of light being called a pixel beam, comprising:

acquiring data representative of said pixel beam in an object space of a first optical system, said pixel beam being occupied by a set of rays of light passing through a pupil of said first optical system and an image conjugate, in said object space of the first optical system, of at least one pixel of a sensor associated to said first optical system;

generating data representative of said pixel beam by computing an image conjugate of said pixel beam through a second optical system. Such a method enables to provide data representative of a collection of pixel beams describing a first optical system that is agnostic, i.e. which is independent of the camera embedding the optical system, since these data are obtained by imaging the collection of pixel beams through a second optical system. Such data representative of a collection of pixel beams enable the generation of parametrized output images from which post-processing can be performed such as creating focal stacks, refocusing, perspective changes, mixing of light-field contents acquired from different acquisition systems, etc.

One of the goals of computing an image of a collection of pixel beams describing a first optical system through a second optical system is to provide a representation of the object space of several optical systems embedded in various cameras in a dual and compact space which corresponds to a focal volume of the optical system. Such a focal volume can be easily projected on an image plane for example during a refocusing operation.

An advantage of imaging a collection of pixel beams describing a first optical system through a second optical system is that the imaged pixel beams are located in a single focal volume and that collections of pixel beams representing various types of optical acquisition devices can be positioned in a same focal volume using the same optical system which make processing of the data representative of the different collections of pixel beams easier.

According to another embodiment of the invention, the method further comprises:
- computing an intersection, in the object space of the first optical system, of said pixel beam with a plane located at a distance z from a centre of the pupil,
- computing an image conjugate of said intersection through said second optical system to provide data representative of the pixel beam.

Such a method enables to perform synthetic aperture refocusing. Synthetic aperture imaging consists in rearranging images acquired by an optical system embedded in a camera in order to simulate another camera for refocusing purposes. The pixel beams representing light-field data acquired by a first camera are thus rearranged so that objects belonging to a given plane are in focus. The plane is defined by its affine equation in a reference coordinate system.

According to another embodiment of the invention, the first optical system is an actual camera and the second optical system is a virtual camera.

In such an embodiment of the invention, the knowledge of the properties of the entrance pupils of the first optical system is required and of the properties of the exit pupils of the second optical system in order to compute the conjugate of the pixel beam in the image space of the second optical system.

As long as the second optical system, i.e. the virtual camera, images precisely its focus plane, the precise knowledge of the properties of its exit pupils is not required since the image of the pixel beam through the second optical system is located on the virtual sensor.

According to another embodiment of the invention, the method the first optical system is a virtual camera and the second optical system is an actual camera.

In such an embodiment of the invention, the knowledge of the properties of the entrance pupils of the first optical system is required and of the properties of the exit pupils of the second optical system, i.e. the actual camera, in order to compute the conjugate of the pixel beam in the image space of the second optical system.

As long as the first optical system, i.e. the virtual camera, images precisely its focus plane, the precise knowledge of the properties of its exit pupils is not required since the pixel beam are the object conjugates of the pixels of a virtual sensor associated with the first acquisition system.

Another object of the invention concerns a device for rendering an image from light field data using obtained in accordance with the method according to different embodiments of the invention.

Another object of the invention concerns a device for generating data representative of a volume occupied by a set of rays of light passing through a pupil of an optical system, said volume occupied by said set of rays of light being called a pixel beam, the device comprising a light field data generation module configured to:
- acquire data representative of said pixel beam in an object space of a first optical system, said pixel beam being occupied by a set of rays of light passing through a pupil of said first optical system and an image conjugate, in said object space of the first optical system, of at least one pixel of a sensor associated to said first optical system;
- generate data representative of said pixel beam by computing an image conjugate of said pixel beam through a second optical system.

Another object of the invention concerns a light field imaging device comprising:
- an array of micro lenses arranged in a regular lattice structure;
- a photosensor configured to capture light projected on the photosensor from the array of micro lenses, the photosensor comprising sets of pixels, each set of pixels being optically associated with a respective micro lens of the array of micro lenses; and
- a device for generating metadata in accordance with claim 8.

Another object of the invention concerns a data package for data representative of a volume in an object space of a first optical system occupied by a set of rays of light passing through a pupil of said first optical system and a conjugate, in said object space of the first optical system, of at least one pixel of a sensor associated to said first optical system, said volume occupied by said set of rays of light being called a pixel beam said data representative of a pixel beam being an image conjugate of said pixel beam through a second optical system.

Some processes implemented by elements of the invention may be computer implemented. Accordingly, such elements may take the form of an entirely hardware embodiment, an entirely software embodiment (including firmware, resident software, micro-code, etc.) or an embodiment combining software and hardware aspects that may all generally be referred to herein as a "circuit", "module" or "system'. Furthermore, such elements may take the form of a computer program product embodied in any tangible medium of expression having computer usable program code embodied in the medium.

Since elements of the present invention can be implemented in software, the present invention can be embodied as computer readable code for provision to a programmable apparatus on any suitable carrier medium. A tangible carrier medium may comprise a storage medium such as a floppy disk, a CD-ROM, a hard disk drive, a magnetic tape device or a solid state memory device and the like. A transient carrier medium may include a signal such as an electrical signal, an electronic signal, an optical signal, an acoustic signal, a magnetic signal or an electromagnetic signal, e.g. a microwave or RF signal.

BRIEF DESCRIPTION OF THE DRAWINGS

Embodiments of the invention will now be described, by way of example only, and with reference to the following drawings in which.

DETAILED DESCRIPTION

As will be appreciated by one skilled in the art, aspects of the present principles can be embodied as a system, method or computer readable medium. Accordingly, aspects of the present principles can take the form of an entirely hardware embodiment, an entirely software embodiment, (including firmware, resident software, micro-code, and so forth) or an embodiment combining software and hardware aspects that can all generally be referred to herein as a "circuit", "module", or "system". Furthermore, aspects of the present principles can take the form of a computer readable storage medium. Any combination of one or more computer readable storage medium (a) may be utilized.

For any optical acquisition system, may it be plenoptic or not, in addition to raw images or epipolar images representing 4D light-field data captured by the optical acquisition system, it is interesting to obtain information related to a correspondence between pixels of a sensor of said optical acquisition system and an object space of said optical acquisition system. Knowing which portion of the object space of an optical acquisition system a pixel belonging to the sensor of said optical acquisition system is sensing enables the improvement of signal processing operations such as de-multiplexing, de-mosaicking, refocusing, etc., and the mixing of images captured by different optical systems with different characteristics. Furthermore, information related to the correspondence between the pixels of the sensor of the optical acquisition system and the object space of said optical acquisition system are independent of the optical acquisition system.

Figure 1:
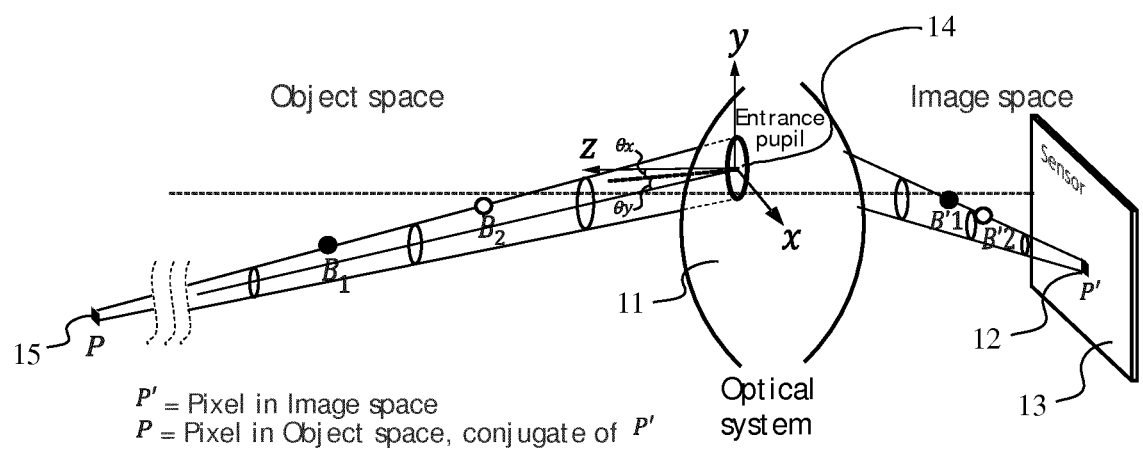
FIG. 1 shows a volume occupied by a set of rays of light passing through a pupil of an optical system 11 of a camera.

The present disclosure introduces the notion of pixel beam 10, shown on FIG. 1, which represents a volume occupied by a set of rays of light passing through a pupil of an optical system 11 of a camera (not shown on FIG. 1) and a conjugate of a pixel of a sensor of the camera in an object space of the optical system in a direction normal to a surface of the pupil The set of rays of light is sensed by a pixel 12 of a sensor 13 of the camera through a pupil 14 of said optical system 11. The optical system 11 may be a combination of lenses fit for photo or video cameras. A pupil of an optical system is defined as the image of an aperture stop as seen through said optical system, i.e. the lenses of the optical acquisition system, which precedes said aperture stop. An aperture stop is an opening which limits the amount of light which passes through the optical system of the optical acquisition system. For example, an adjustable blade diaphragm located inside a camera lens is the aperture stop for the lens. The amount of light admitted through the diaphragm is controlled by the diameter of the diaphragm opening which may adapted depending of the amount of light a user of the camera wishes to admit. For example, making the aperture smaller reduces the amount of light admitted through the diaphragm, and, simultaneously, increases the depth of focus. The apparent size of a stop may be larger or smaller than its physical size because of the refractive action of a portion of the lens. Formally, a pupil is the image of the aperture stop through all lenses of the optical acquisition system located between the physical stop and the observation space.

A pixel beam 10 is defined as a pencil of rays of light that reach a given pixel 12 when propagating through the optical system 11 via an entrance pupil 14. As light travels on straight lines in free space, the shape of such a pixel beam 10 can be defined by two sections, one being the conjugate 15 of the pixel 12, and the other being the entrance pupil 14. The pixel 12 is defined by its non-null surface and its sensitivity map.

Figure 2:
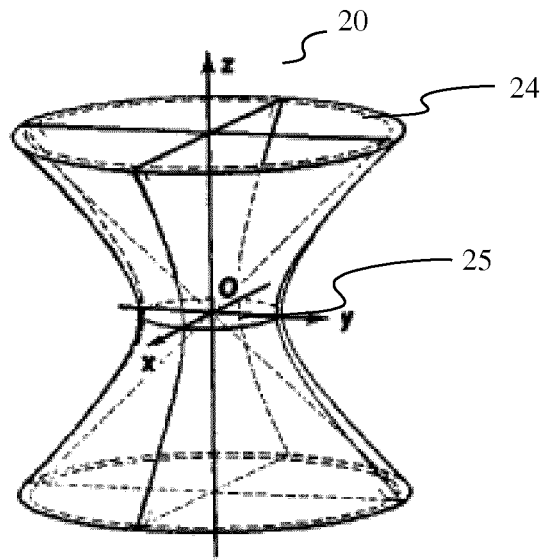
FIG. 2 shows a hyperboloid of one sheet representing a pixel beam according to an embodiment of the invention.

In a first embodiment of the invention, a pixel beam 30 may be represented by an hyperboloid of one sheet, as shown on FIG. 2, supported by two elements: the pupil 24 and the conjugate 25 of the pixel 12 in the object space.

A hyperboloid of one sheet is a ruled surface that can support the notion of pencil of rays of light and is compatible with the notion of "étendue" of physical light beams, notion linked to the preservation of energy across sections of the physical light beams.

Figure 3:
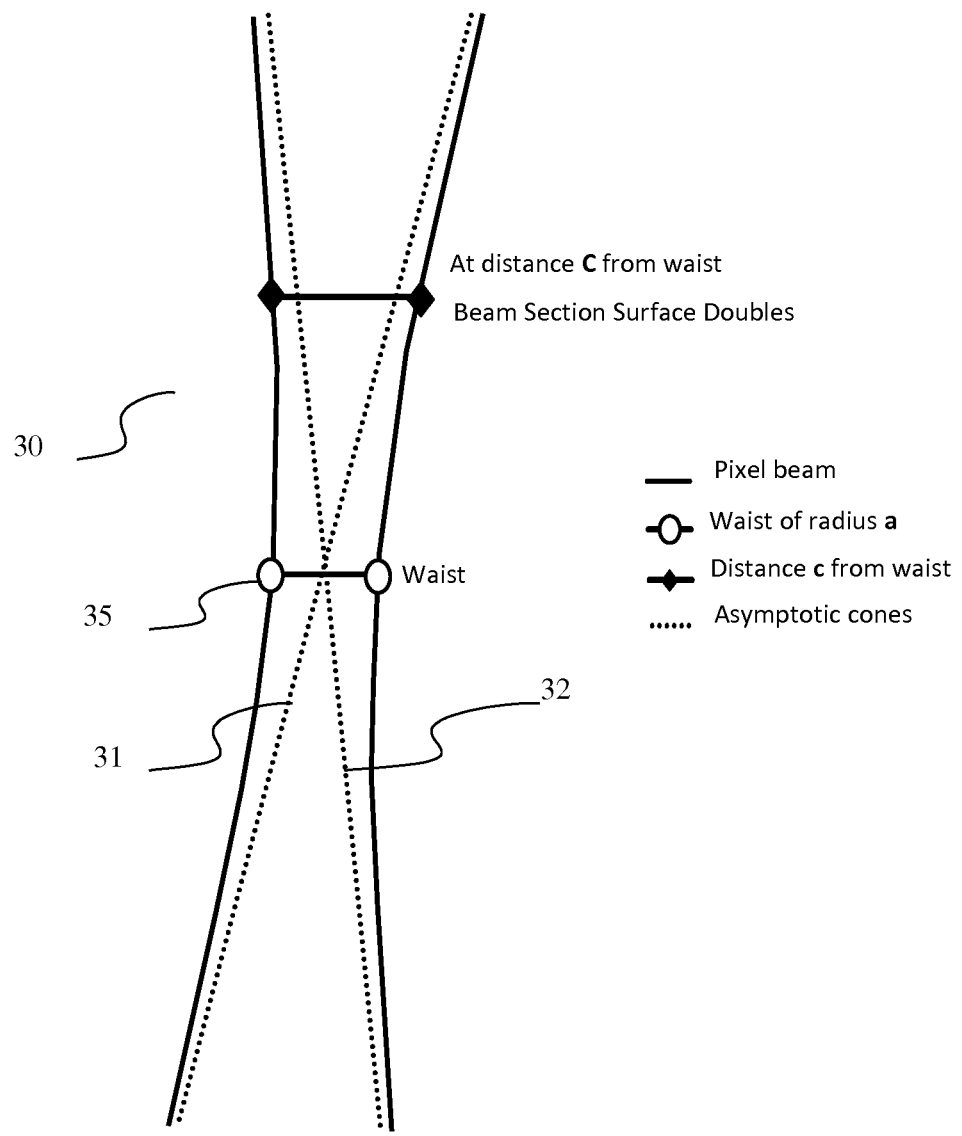
FIG. 3 shows a hyperboloid of one sheet and its asymptotic cones.

As represented on FIG. 3, a hyperboloid of one sheet 30 is mostly identical to its asymptotic cones 31, 32, except in the fundamental region of its smallest section, called the waist 35, which corresponds to the conjugate 15 in the object space. For plenoptic systems, such as light-field cameras, this is the region where space sampling by multiple path rays is performed. Sampling space with unique cones degenerating to a point in this region is not adequate, as pixel 12 sensitivity is significant on some tens of square microns on its surface and cannot be represented by a mathematical point with infinitely small surface as would be a cone tip.

In an embodiment of the invention, each pixel beam 10, 20, 30, is defined by four independent parameters: $z_P$, $\theta_x$, $\theta_y$, a defining the position and size of the pixel conjugate 15, 35, in front of the pupil 14, 24 and by six pupilar parameters $x_O$, $y_O$, $z_O$, $\theta_{x0}$, $\theta_{y0}$, r which define the position, orientation and radius of the pupil 14, 24. These six pupilar parameters are common to the collection of pixel beams, when represented by a hyperboloid of one sheet, sharing a same pupil 14, 24. Indeed, a pixel beam represents the volume occupied by a set of rays of light in the object space of the optical system 11 sensed by the pixel 12 through the pupil 14, i.e. to a given couple pixel 12/pupil 14, 24 corresponds a unique pixel beam 10, 20, 30, but a plurality of distinct pixel beams can be supported by a same pupil 14, 24.

An origin O of a coordinate system (x, y, z) in which the parameters of the hyperboloid of one sheet representing the pixel beam 10, 20, 30 are defined corresponds to the centre of the pupil 14 as shown on FIG. 1, where the z axis defines a direction normal to the surface of the pupil 14, 24.

The parameters $\theta_x$, $\theta_y$, define chief ray directions relative to the entrance of the pupil 14 centre. They depend on the pixel 12 position on the sensor 13 and on the optical elements of the optical system 11. More precisely, the parameters $\theta_x$, $\theta_y$ represent shear angles defining a direction of the conjugate 15 of the pixel 12 from the centre of the pupil 14.

The parameter $z_P$ represents a distance of the waist 35 of the pixel beam 10, 20, 30, or the conjugate 15 of the pixel 12, along the z axis.

The parameter a represents the radius of the waist 35 of the pixel beam 10, 20, 30.

For optical systems 11 where optical distortions and field curvatures may be modelled, the parameters $z_P$ and a can depend on the parameters $\theta_x$ and $\theta_y$ via parametric functions.

The four independent parameters are related to the pixel 12 and its conjugate 15.

The six complementary pupilar parameters defining a pixel beam 10, 20, 30 are:
r which represents the pupil 14, 24 radius,
$x_O$, $y_O$, $z_O$ which represent the coordinates of the pupil 14, 24 centre in the (x, y, z) coordinate system, and
$\theta_{x0}$, $\theta_{y0}$ which represent the orientation of the pupil 14, 24 in the reference (x, y, z) coordinate system.

These six pupilar parameters are related to the pupil 14, 24. Another parameter c is defined. Such a parameter c is dependent on the parameters $z_P$ and a related to the pixel 12 and its conjugate 15 and on the parameters r related to the pupil 14, 24. The parameter c defines the angular aperture α of the pixel beam 10, 20, 30 and is given by the formula:

$$\tan(\alpha) = \frac{a}{c}.$$

Thus the expression of the parameter c is given by the following equation:

$$c^2 = \frac{a^2 z_P^2}{r^2 - a^2} \quad (1)$$

The coordinates (x, y, z), in the object space, of points belonging to the surface delimiting the pixel beam 10, 20, 30 are function of the above defined sets of parameters related to the pupil 14, and to the conjugate 15 of the pixel. Thus, equation (2) enabling the generation of the hyperboloid of one sheet representing the pixel beam 10, 20, 30 is:

$$\frac{(x - z \cdot \tan(\theta_x))^2}{a^2} + \frac{(y - z \cdot \tan(\theta_y))^2}{a^2} - \frac{(z - z_P)^2}{c^2} = 1 \quad (2)$$

A parametric equation (3) of the same hyperboloid representing the pixel beam 10, 20, 30 is:

$$\begin{cases} x = a\sqrt{1 + \frac{(z - z_P)^2}{c^2}} \cdot \cos(v) + z \cdot \tan(\theta_x) \\ y = a\sqrt{1 + \frac{(z - z_P)^2}{c^2}} \cdot \sin(v) + z \cdot \tan(\theta_y) \end{cases} \quad (3)$$

wherein v is an angle in the (x, y) plane enabling the generation of the pixel beam 10, 20, 30 from a generating hyperbola, v varies in [0, 2π] interval, and z∈[0, ∞] is the coordinate along the z axis which defines a direction normal to the surface of the pupil 14, 24. Equations (2) and (3) are written on the assumption that the section of the pixel 12 and its conjugate 15 are circular and that the section of the pupil 14, 24 is circular as well.

Information related to a correspondence between pixels of a sensor of said optical acquisition system and an object space of said optical acquisition system may take the form of either a set of parameters comprising the four independent parameters: $z_P$, $\theta_x$, $\theta_y$, a defining the position and size of the pixel conjugate 15, 35, in front of the pupil 14, 24 and the six pupilar parameters $x_O$, $y_O$, $z_O$, $\theta_{x0}$, $\theta_{y0}$, r which define the position, orientation and radius of the pupil 14, 24 when the pixel beam is to be represented by its parametric equation.

Thus, this set of parameters is provided in addition to raw images or epipolar images representing 4D light-field data captured by the optical acquisition system in order to be used while processing the 4D light-field data.

Figure 4:
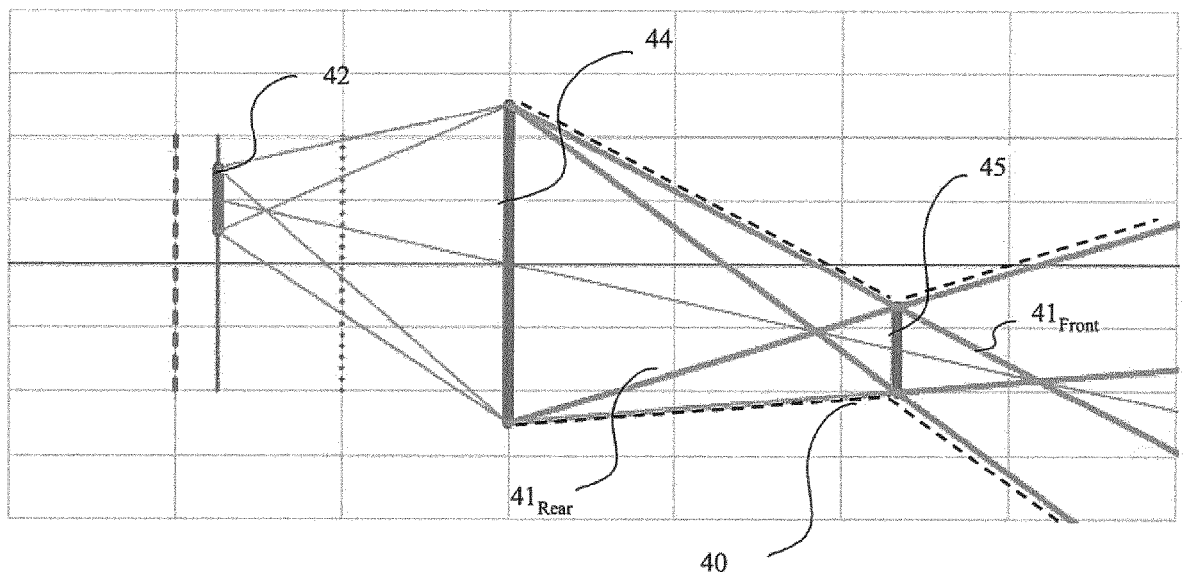
FIG. 4 shows a pixel beam represented by two coaxial, partially overlapping cones according to an embodiment of the invention.

In a second embodiment of the invention, a pixel beam 40 may be represented by two coaxial, partially overlapping cones a front cone $41_F$ and a rear cone $41_R$ as shown on FIG. 4, supported by two elements: the pupil 44 and the conjugate 45 of the pixel 42 in the object space, i.e. the surface in the object space that is imaged on the pixel.

The front cone $41_F$ is the image of a convex frustum defined by the pixel 42 and the pupil 44. The apex of the convex frustum lies beyond the sensor of the optical acquisition system. By construction, the front cone $41_F$ is converging in the object space of the optical acquisition system and the apex of the front cone $41_F$ lies between the conjugate of the pixel 45, or the waist of the pixel beam 40, and the pupil dd. The front cone $41_F$ derives from the solid angle subtended by the pupil 44 at the pixel 42.

The rear cone $41_R$ is the image of a cone defined by the pixel 42 and the pupil 44, the apex of which lies between the pupil 44 and the sensor of the optical acquisition system. By construction, the apex of the rear cone $41_R$ is located beyond the waist 45 of the pupil 40. The rear cone $41_R$ does not necessarily converge in the object space of the optical acquisition system, in some cases, it may degenerate into a cylinder or a diverging cone. In the latter case, the apex of the diverging cone lies in the image space of the optical acquisition system, i.e. before the entrance of the pupil 44.

The front cone $41_F$ and the rear cone $41_R$ share the same revolution axis, which is a line joining the centre of the pupil 44 and the centre of the waist 45.

Cones are ruled surfaces that can support the notion of pencil of rays of light and when combining two cones is compatible with the notion of "étendue" of physical light beams, notion linked to the preservation of energy across sections of the physical light beams. Intersections of cones with planes are conic curves, as for hyperboloids, which can be characterized by a plurality of coefficients. Considering its apex, a cone may be represented by three angular parameters: a polar angle measured from the revolution axis of the cone, up to the apex angle and the direction of the revolution axis given by two angles.

Let xyz be the coordinate system of the optical acquisition system, z denoting the optical axis of the optical acquisition system with z>0 in the object space of the optical acquisition system and the centre of the pupil 44 being the origin of said coordinate system.

The optics of the optical acquisition system images the object space of the optical acquisition system from the range z∈[2f; +∞] into the image space of the optical acquisition system z∈[-2f; -f], where f is the focal length of the optics of the optical acquisition system. The location of the pupil 44 and the waist 45 of the pixel beam 40 are known in the coordinate system xyz of the optical acquisition system from the calibration of the optical acquisition system. The pupil 44 and the waist 45 are assumed to be parallel and are both normal to the z axis.

Let us call z' the chief ray of the pixel beam 40. The chief ray is the line joining the centre of the pupil 44 and the centre of the waist 45 of the pixel beam 40. The chief ray is also the revolution axis and the axis of symmetry of the pixel beam 40. Thus, in the coordinate system xyz', the pixel beam 40 is a solid of revolution.

Both the apices of the front cone $41_F$ and the rear cone $41_R$ are located on the chief ray z' of the pixel beam 40. Under the thin lens approximation, the coordinates of these two apices are computed in the coordinate system xyz of the optical acquisition system as follow, under the assumption that the sensor of the optical acquisition system is not located the rear focal plane:

$$\begin{cases} \frac{z_w - z_{front}}{W} = \frac{z_{front} - z_P}{P} \\ \frac{z_{rear} - z_w}{W} = \frac{z_{rear} - z_P}{P} \end{cases} \quad (4)$$

i.e.:

$$\begin{cases} z_{front} = \dfrac{P \cdot z_W + W \cdot z_P}{P + W} \\ z_{rear} = \dfrac{P \cdot z_W - W \cdot z_P}{P - W} \end{cases} \quad (5)$$

where P, $z_P$, W and $z_w$ respectively denote the diameter of the pupil 44 with P>0, its z-coordinate, the diameter of the pixel's conjugate 45 with 0<W<+∞, and its z-coordinate 0<$z_w$<+∞.

The z-coordinate $z_{rear}$ of the apex of the rear cone 41$_R$ may be positive, when the rear cone 41$_R$ is a converging cone, negative, when the rear cone 41$_R$ is a diverging cone. It may also be infinite if the pupil 44 and the pixel's conjugate 45 of the pixel beam are of the same size.

If the sensor of the optical acquisition system is located on the rear focal plane, then W=+∞ and $z_w$=+∞. As their ratio is a constant:

$$\dfrac{1}{z_{front} - z_P} = \dfrac{p}{P \cdot f} = \dfrac{1}{z_P - z_{rear}} \quad (6)$$

where p and f respectively represent the diameter of the pixel 42 with p>0 and the focal length of the optics of the optical acquisition system with f>0 assuming the optics of the optical acquisition system is a converging lens.

The apex angles are given by:

$$\begin{cases} \tan\theta_{front} = \dfrac{W/2}{|z_{front} - z_w|} \\ \tan\theta_{rear} = \dfrac{W/2}{|z_{rear} - z_w|} \end{cases} \quad (7)$$

Considering the apex of each cones, which union represents a pixel beam 40, rays can be defined with two angular parameters: the polar angle measure from the revolution axis of the pixel beam, up to the apex angle, and an azimuth in [0,2π[.

Those information related to pixel beams are metadata associated to a given optical acquisition system. They may be provided as a data file stored for example on a CD-ROM or a flash drive supplied with the optical acquisition system. The data file containing the additional information related to pixel beams may also be downloaded from a server belonging to the manufacturer of the optical acquisition system. In an embodiment of the invention, these additional information related to pixel beams may also be embedded in a header of the images captured by the optical acquisition system.

The knowledge of these information related to pixel beams enables the processing of images captured by any optical acquisition system independently of the proprietary file format and of the features of the optical acquisition system used to capture the images to be processed.

The knowledge of information related to pixel beams enables the processing of images captured by any optical acquisition system independently of the proprietary file format and of the features of the optical acquisition system used to capture the images to be processed.

Figure 5:
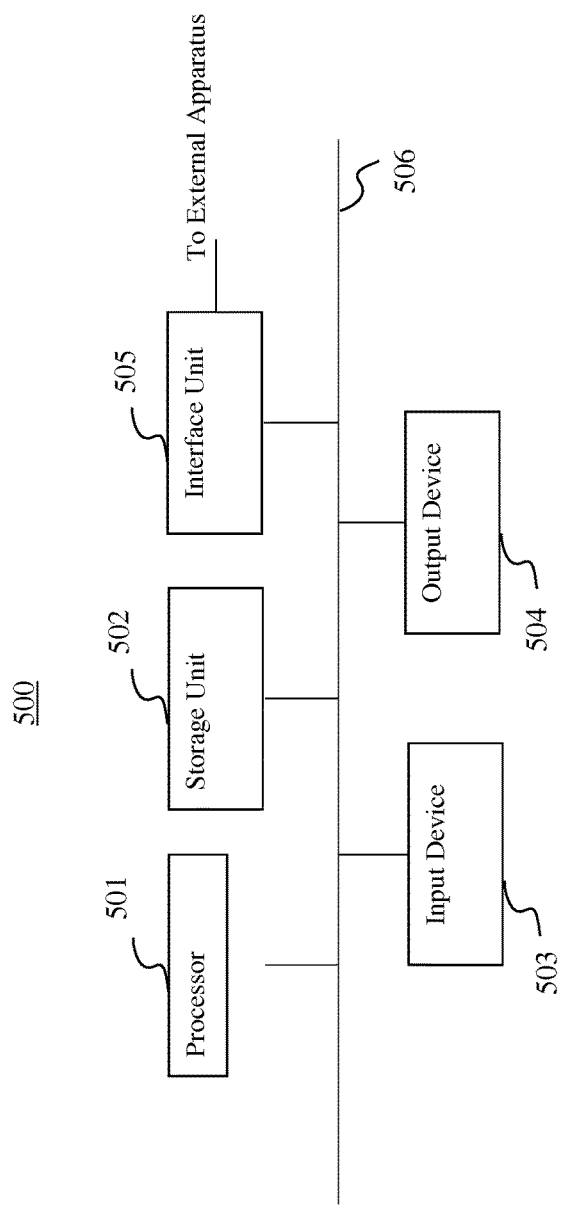
FIG. 5 is a schematic block diagram illustrating an example of an apparatus for generating data representative of pixel beams according to an embodiment of the invention.

FIG. 5 is a schematic block diagram illustrating an example of an apparatus for generating data representative of pixel beams representing the object space of a first optical system by imaging said pixel beams through a second optical system according to an embodiment of the present disclosure.

The apparatus 500 comprises a processor 501, a storage unit 502, an input device 503, a display device 504, and an interface unit 505 which are connected by a bus 506. Of course, constituent elements of the computer apparatus 500 may be connected by a connection other than a bus connection.

The processor 501 controls operations of the apparatus 500. The storage unit 502 stores at least one program capable of generating data representative of pixel beams representing the object space of a first optical system when these pixel beams are imaged through a second optical system to be executed by the processor 501, and various data, including parameters related to a position of the pixel 12 on the sensor 13 or parameters related to the first optical system 11 of the optical acquisition system and a second optical system, parameters used by computations performed by the processor 501, intermediate data of computations performed by the processor 501, and so on. The processor 501 may be formed by any known and suitable hardware, or software, or a combination of hardware and software. For example, the processor 501 may be formed by dedicated hardware such as a processing circuit, or by a programmable processing unit such as a CPU (Central Processing Unit) that executes a program stored in a memory thereof.

The storage unit 502 may be formed by any suitable storage or means capable of storing the program, data, or the like in a computer-readable manner. Examples of the storage unit 502 include non-transitory computer-readable storage media such as semiconductor memory devices, and magnetic, optical, or magneto-optical recording media loaded into a read and write unit. The program causes the processor 501 to perform a process for computing data representative of the pixel beams of a collection of pixel beams representative of the object space of a first optical system from an image conjugate of said pixel beam through a second optical system beam according to an embodiment of the present disclosure as described hereinafter with reference to FIG. 6.

The input device 503 may be formed by a keyboard, a pointing device such as a mouse, or the like for use by the user to input commands, to make user's selections of parameters used for generating a parametric representation of a volume occupied by a set of rays of light in an object space of an optical system. The output device 604 may be formed by a display device to display, for example, a Graphical User Interface (GUI), images generated according to an embodiment of the present disclosure. The input device 503 and the output device 504 may be formed integrally by a touch-screen panel, for example.

The interface unit 505 provides an interface between the apparatus 500 and an external apparatus. The interface unit 505 may be communicable with the external apparatus via cable or wireless communication. In an embodiment, the external apparatus may be an optical acquisition system such as an actual camera.

Figure 6:
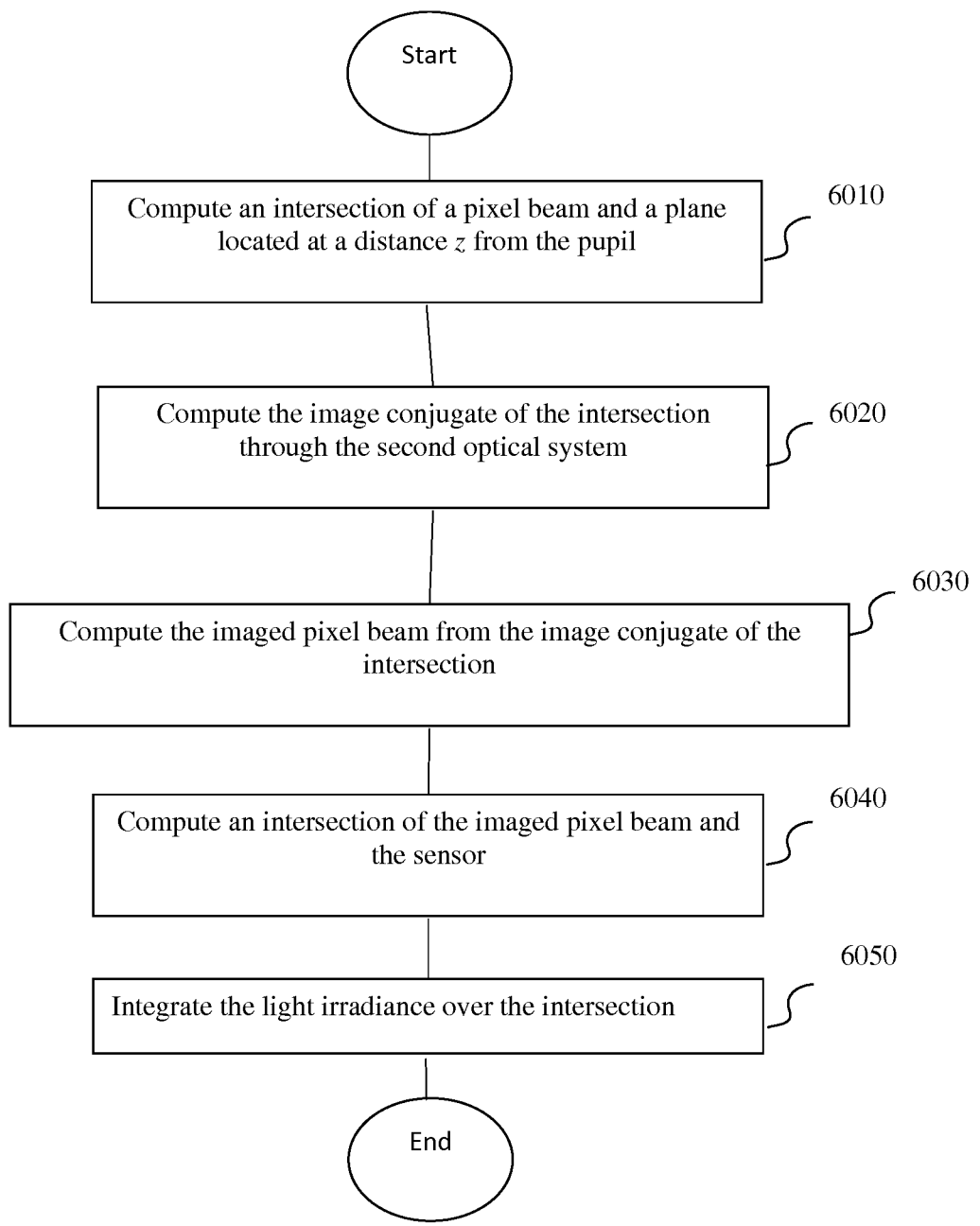
FIG. 6 is a flow chart for explaining a process for encoding an image captured by the optical acquisition system according to an embodiment of the disclosure.

FIG. 6 is a flow chart for explaining a process for encoding an image captured by the optical acquisition system according to an embodiment of the invention.

Figure 7:
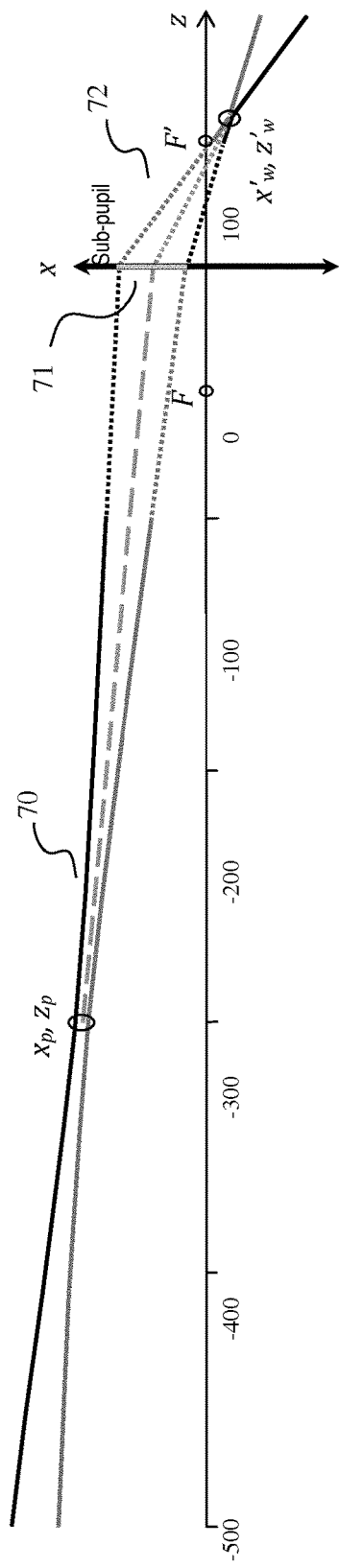

The processor 501 of the apparatus 500 executes the program capable of computing data representative of at least one pixel beam 70 of a collection of pixel beams representative of the object space of a first optical system (not shown on the figure) from an image conjugate 72 of said pixel beam 70 through a second optical system 71 as represented on FIG. 7. In the following example, the pixel beams 70, 72 are represented by a hyperboloid of one sheet 20.

Thus, the processor 501 computes an image conjugate 72 of the pixel beam 70 through the optical system 71, which is for example a thin lens, to provide data representative of the pixel beam 70 in the focal volume of the optical system 71.

The image conjugate 72 of the pixel beam 70 through the optical system 71 may be computed as explained hereafter.

As described in reference to FIGS. 1 to 3, a pixel beam linked to a pupil of an optical system is defined by six extrinsic parameters:

r: the entrance pupil radius of the first optical system, $x_O$, $y_O$, $z_O$: the coordinates of the entrance pupil centre of the first optical system in a reference coordinate system, and $\theta_{x0}$, $\theta_{y0}$: an orientation of the entrance pupil of the first optical system in the reference coordinate system.

In the reference coordinate system, and keeping $\theta_{x0} = \theta_{y0} = 0$ for simplicity, a parametric equation of the hyperboloid representing the pixel beam is given by:

$$\frac{(x - x_O - (z - z_0) \cdot \tan(\theta_x))^2}{a^2} + \frac{(y - y_O - (z - z_0) \cdot \tan(\theta_y))^2}{a^2} - \frac{(z - z_O - z_P - z_O)^2}{c^2} = 1 \quad (8)$$

or equivalently:

$$\begin{cases} x = x_O + a\sqrt{1 + \frac{(z - z_P)^2}{c^2}} \cdot \cos(v) + (z - z_0) \cdot \tan(\theta_x) \\ y = y_O + a\sqrt{1 + \frac{(z - z_P)^2}{c^2}} \cdot \sin(v) + (z - z_0) \cdot \tan(\theta_y) \end{cases} \quad (9)$$

In an embodiment of the invention, a value representing a colour, such as a RGB value, acquired by a pixel of the sensor of the first optical acquisition system is associated to the corresponding pixel beam 70.

The parameters defining a plane surface representing the second optical system 71 are either defined when the second optical system 71 is a virtual optical system or retrieved when the second optical system is an actual optical system:

coordinates of the optical centre of the second optical system 71 are $x_C$, $y_C$, $z_C$ coordinates of a unit vector normal to the surface of the optical system 71: $\theta_{xC}$, $\theta_{yC}$ a focal f of the optical system 71.

In order to simplify explanations, the optical centre of the second optical system 71 is taken in the same plane as the pupil centre of the first optical system: $z_C = z_O$ and the optical system 71 is supposed to be parallel to the pupil, i.e. $\theta_{xC} = \theta_{yC} = 0$.

The coordinates of a point M relative to the optical system 71 center C are denoted: x, y, z. The coordinates of the image M' of point M through the optical system 71, are denoted: x', y', z'. Each of these coordinates are algebraic values.

The coordinates of point M' are computed using the Newton's form of "the Lens Maker formula" which is:

$$(|z| - f)(|z'| - f) = f^2 \quad (10)$$

Since point M is located before the optical system 71, i.e. $z < 0$ and point M' is located after the optical system 71, i.e. $z' > 0$, then:

$$(-z - f)(z' - f) = f^2 \quad (11)$$

which gives $$z' = f - \frac{f^2}{z + f} = \frac{f \cdot z}{z + f} \quad (12)$$

When the optical system 71 is a thin lens, as the ray of light passing through its optical centre is not deviated magnification is given by:

$$m = \frac{x'}{x} = \frac{y'}{y} = \frac{z'}{z}$$

which gives:

$$\begin{cases} z' = \frac{f \cdot z}{f + z} \\ x' = x\frac{z'}{z} \\ y' = y\frac{z'}{z} \end{cases} \quad (13)$$

and conversely:

$$\begin{cases} z = \frac{f \cdot z'}{f - z'} \\ x = x'\frac{z}{z'} \\ y = y'\frac{z}{z'} \end{cases} \quad (14)$$

When M is a point belonging to the surface of a pixel beam 70 the coordinates of point M' situated on the surface of the imaged pixel beam are:

$$\begin{cases} z' = \frac{f \cdot z}{f + z} \\ x' = x\frac{z'}{z} \\ y' = y\frac{z'}{z} \end{cases} \quad (15)$$

As a paraxial lens transforms rays of light (straight lines) in object space into rays of light in image space, and as pixel beams 70 are represented by a ruled surface, the imaged pixel beams 72 are also represented by a ruled surface, as the image of an hyperboloid of one sheet in object space is an hyperboloid of one sheet in image space.

Let's determine the parameters of the hyperboloid representing the imaged pixel beam 72 from the parameters of the hyperboloid representing the pixel beam 70 and from the parameters of the optical system 71.

Considering the following equation:

$$\begin{cases} x = x_O + a\sqrt{1 + \frac{(z - z_P)^2}{c^2}} \cdot \cos(v) + (z - z_0) \cdot \tan(\theta_x) \\ y = y_O + a\sqrt{1 + \frac{(z - z_P)^2}{c^2}} \cdot \sin(v) + (z - z_0) \cdot \tan(\theta_y) \end{cases} \quad (9)$$

representing the pixel beam 70 where $\theta_x=\theta_y=0$, $x_0=y_0=z_0=0$ and 84=0 in order to reduce the analysis to a pixel beam on axis, and to the x, z plane.

The parameters to be determined are then $z'_W$, a' which are a function of $z_P$, a, f, r, where $z'_W$ is the z coordinate of the waist of the imaged pixel beam 72 (W' is not the conjugate point of P through the imaging process due to beam aperture—a≠0) and a' is the radius of the waist of the imaged pixel beam 72.

With the assumption that $\theta_x=\theta_y=0$, $x_0=y_0=z_0=0$ and $v=0$ the equation 16 applied to point M simplifies to:

$$\begin{cases} x = a\sqrt{1 + \frac{(z-z_P)^2}{c^2}} \\ y = 0 \end{cases} \quad (16)$$

Using the paraxial lens transform of equation 14 for M we get:

$$x'\frac{z}{z'} = a\sqrt{1 + \frac{\left(\frac{f \cdot z'}{f-z'} - z_P\right)^2}{c^2}} \quad (17)$$

$$\Leftrightarrow \frac{x'^2}{a^2} = \left(\frac{f-z'}{f}\right)^2 \left(1 + \frac{\left(\frac{f \cdot z'}{f-z'} - z_P\right)^2}{c^2}\right) \quad (18)$$

$$\Leftrightarrow \frac{x'^2}{a^2} = \frac{(f-z')^2}{f^2} + \frac{((f+z_P) \cdot z' - f \cdot z_P)^2}{f^2 c^2} \quad (19)$$

$$\Leftrightarrow \frac{f^2 c^2}{a^2} x'^2 = c^2(f-z')^2 + ((f+z_P) \cdot z' - f \cdot z_P)^2 \quad (20)$$

which is the equation representing the imaged pixel beam 72 in the focal volume of the optical system 71.

Deriving e equation (20) enables the calculation of the minima and/or maxima of the hyperbolas representing the pixel beams by finding the zero crossing of the derivative.

Equation (20) when developed gives:

$$\frac{f^2 c^2}{a^2} x'^2 = \quad (21)$$
$$((f+z_P)^2 + c^2) \cdot z'^2 - 2f(z_P(f+z_P) + c^2) \cdot z' + f^2(z_P^2 + c^2)$$

The derivative of equation (21) is given by:

$$\frac{d}{dz'}\left(\frac{f^2 c^2}{a^2} x'^2\right) = \quad (22)$$
$$\frac{d}{dz'}\left(((f+z_P)^2 + c^2)z'^2 - 2f(z_P(f+z_P) + c^2) \cdot z' + f^2(z_P^2 + c^2)\right)$$

$$\Leftrightarrow \frac{d}{dz'}\left(\frac{f^2 c^2}{a^2} x'^2\right) = 2((f+z_P)^2 + c^2)z' - 2f(z_P(f+z_P) + c^2) \quad (23)$$

Computing the zero crossing gives of the derivative (23):

$$\frac{d}{dz'}\left(\frac{f^2 c^2}{a^2} x'^2\right) = 0 \Leftrightarrow z'_w = \frac{f(z_P(f+z_P) + c^2)}{(f+z_P)^2 + c^2} \quad (24)$$

$$\Leftrightarrow z'_w = f\left(1 - \frac{f(f+z_P)}{(f+z_P)^2 + c^2}\right) \quad (25)$$

Knowing that $$c^2 = \frac{a^2 z_P^2}{r^2 - a^2}$$

each term of $$z'_w = f\left(1 - \frac{f(f+z_P)}{(f+z_P)^2 + \frac{a^2 z_P^2}{r^2 - a^2}}\right)$$

can be divided by $z_P^2$. Thus, if $z_P \gg f$ and $(f+z_P) \cong z_P$ an approximation can be derived:

$$\widetilde{z'_w} = f\left(1 - \frac{f}{z_P}\left(1 - \frac{a^2}{r^2}\right)\right) \quad (26)$$

Since a' is the radius of the wait of the imaged pixel beam 72, it is also the minimum value of the positive hyperbola for the imaged pixel beam 72 i.e. it corresponds to the value of x' as defined by equation 20 for $z'=z'_W$:

$$a' = x'(z'_W) \quad (27)$$

This gives:

$$\frac{f^2 c^2}{a^2} a'^2 = c^2(f - z'_w)^2 + ((f+z_P) \cdot z'_w - f \cdot z_P)^2 \quad (28)$$

$$\Leftrightarrow a' = \frac{a}{f}\sqrt{(f-z'_w)^2 + \frac{((f+z_P) \cdot z'_w - f \cdot z_P)^2}{c^2}} \quad (29)$$

$$\Leftrightarrow a' = \frac{a}{f}\sqrt{(f-z'_w)^2 + \frac{r^2 - a^2}{a^2}\left(\frac{f+z_P}{z_P} \cdot z'_w - f\right)^2} \quad (30)$$

Let's consider a point x, y and its conjugate x', y' through the optical system 71. For a ray of light passing by point x, y and the optical system 71 centre, the laws of optics give:

$$\frac{x}{z} = \frac{x'}{z'}. \quad (31)$$

If the ray of light is a ray of incidence $\theta_x$ when hitting the optical system 71 at height $x_0$ then:

$$\tan \theta_x = \frac{x - x_0}{z} = \frac{x}{z} - \frac{x_0}{z} \quad (32)$$

and similarly:

$$\tan \theta'_x = \frac{x'}{z'} - \frac{x_0}{z'} \quad (33)$$

Thus:

$$\tan \theta'_x = \tan \theta_x + \frac{x_0}{z} - \frac{x_0}{z'} = \tan \theta_x + x_0\left(\frac{1}{z} - \frac{1}{z'}\right) \quad (34)$$

As known from the lens maker formula:

$$\frac{1}{z'} = \frac{1}{z} + \frac{1}{f}$$

we obtain:

$$\tan \theta'_x = \tan \theta_x - \frac{x_0}{f} \quad (35)$$

And similarly:

$$\tan \theta'_y = \tan \theta_y - \frac{y_0}{f} \quad (36)$$

Consequently, the equation representing the imaged pixel beam 72 is:

$$\begin{cases} x = x_o + a'\sqrt{1 + \frac{(z-z'_w)^2}{c^2}} \cdot \cos(v) + (z - z_0) \cdot \tan(\theta'_x) \\ y = y_o + a'\sqrt{1 + \frac{(z-z'_w)^2}{c^2}} \cdot \sin(v) + (z - z_0) \cdot \tan(\theta'_y) \end{cases} \quad (37)$$

with parameters: $z'_w$, $\theta'_x$, $\theta'_y$, $a'$ obtained from the parameters $z_P$, $\theta_x$, $\theta_y$, $a$ of the pixel beam 70 by:

$$\begin{cases} z'_w = f\left(1 - \frac{f(f+z_P)}{(f+z_P)^2 + c^2}\right) \\ a' = \frac{a}{f}\sqrt{(f - z'_w)^2 + \frac{((f+z_P)\cdot z'_w - f \cdot z_P)^2}{c^2}} \\ \tan \theta'_x = \tan \theta_x - \frac{x_0}{f} \\ \tan \theta'_y = \tan \theta_y - \frac{y_0}{f} \end{cases} \quad (38)$$

with $$c^2 = \frac{a^2 z_P^2}{r^2 - a^2}$$

In a step 6010, the processor 501 of the apparatus 500 computes an intersection, in the object space of the first optical system, of a pixel beam 70 of a collection of pixel beams and a given plane, defined by its affine equation in a reference coordinate system.

Then in a step 6020, the processor 501 computes the image conjugate of this intersection through the optical system 71.

In a step 6030, the processor 501 computes the imaged pixel beam 72 from the image conjugate of the intersection computed during step 6020.

In a step 6040, the processor 501 of the apparatus 500 then computes an intersection of the imaged pixel beam 72 with the sensor of the optical system 71.

Then, in a step 6050, the processor 501 computes the integration of the light irradiance over the said intersection.

Such a method for generating data representative of pixel beams offers a precise knowledge and parametrization of a collection of pixel beams in a given focal volume. The parameters representative of the imaged pixel beams associated with RGB values associated to the pixels corresponding to said pixel beams form a parametric sampling of the focal volume of the second optical system 72 useful for image processing operations since the parametric sampling of the focal volume is homogeneous.

In an embodiment of the invention, the first optical system, which object space has been sampled by the collection of pixel beams 70 is the optical system of an actual camera whereas the second optical system 71 is the optical system of a virtual camera.

In another embodiment of the invention, the first optical system, which object space has been sampled by the collection of pixel beams 70 is the optical system of a virtual camera whereas the second optical system 71 is the optical system of an actual camera.

Although the present invention has been described hereinabove with reference to specific embodiments, the present invention is not limited to the specific embodiments, and modifications will be apparent to a skilled person in the art which lie within the scope of the present invention.

Many further modifications and variations will suggest themselves to those versed in the art upon making reference to the foregoing illustrative embodiments, which are given by way of example only and which are not intended to limit the scope of the invention, that being determined solely by the appended claims. In particular the different features from different embodiments may be interchanged, where appropriate.

The invention claimed is:

1. A computer implemented method comprising generating data representative of a volume occupied by a set of rays of light passing through a pupil of an optical system, said volume occupied by said set of rays of light being called a first pixel beam,
    acquiring data representative of said first pixel beam in an object space of a first optical system, said first pixel beam being occupied by a set of rays of light passing through a pupil of said first optical system and an image conjugate, of at least one pixel of a sensor associated to said first optical system;
    determining in the object space of the first optical system an intersection, of said first pixel beam with a plane; wherein said plane is located at a first distance from said pupil;
    determining an image conjugate of said intersection through a second optical system and generating data representative of a second imaged pixel beam based on said image conjugate.

2. The method according to claim 1 further comprising:
    determining said an intersection of said second imaged pixel beam with a sensor associated to the second optical system.

3. The method according to claim 1, wherein the first optical system is an optical system of an actual camera and the second optical system is an optical system of a virtual camera.

4. The method according to claim 1, wherein the first optical system is an optical system of a virtual camera and the second optical system is an optical system of an actual camera.

5. The method according to claim 2, wherein the first optical system is an optical system of an actual camera and the second optical system is an optical system of a virtual camera.

6. The method according to claim 2, wherein the first optical system is an optical system of a virtual camera and the second optical system is an optical system of an actual camera.

7. A device comprising
a processor configured to generate data representative of a volume occupied by a set of rays of light passing through a pupil of an optical system, said volume occupied by said set of rays of light being called a first pixel beam;
said processor also configured to acquire data representative of said first pixel beam in an object space of a first optical system, said first pixel beam being occupied by a set of rays of light passing through a pupil of said first optical system and an image conjugate, of at least one pixel of a sensor associated to said first optical system, and to determine in the object space of the first optical system an intersection of said first pixel beam with a plane; wherein said plane is located at a first distance from said pupil;
said processor also configured to determine an image conjugate of said intersection through a second optical system and generate data representative of a second imaged pixel beam based on said image conjugate.

8. The device according to claim 7, wherein said processor is further configured to determine an intersection of said second imaged pixel beam with a sensor associated to the second optical system.

9. The device according to claim 7, wherein the first optical system is an optical system of an actual camera and the second optical system is an optical system of a virtual camera.

10. The device according to claim 7, wherein the first optical system is an optical system of a virtual camera and the second optical system is an optical system of an actual camera.

11. The device according to claim 8, wherein the first optical system is an optical system of an actual camera and the second optical system is an optical system of a virtual camera.

12. The device according to claim 8, wherein the first optical system is an optical system of a virtual camera and the second optical system is an optical system of actual camera.

13. The device of claim 7, wherein said device is configured for rendering an image from said data.

14. The device of claim 7, further comprising:
an array of micro lenses arranged in a regular lattice structure;
a photosensor configured to capture light projected on the photosensor from the array of micro lenses, the photosensor comprising sets of pixels, each set of pixels being optically associated with a respective micro lens of the array of micro lenses; and
a component for generating metadata.

15. The device of claim 8, further comprising:
an array of micro lenses arranged in a regular lattice structure;
a photosensor configured to capture light projected on the photosensor from the array of micro lenses, the photosensor comprising sets of pixels, each set of pixels being optically associated with a respective micro lens of the array of micro lenses; and
a component for generating metadata.

16. A non-transitory computer program product for a programmable apparatus, the computer program product comprising:
acquiring data representative of a first pixel beam in an object space of a first optical system, said first pixel beam being occupied by a set of rays of light passing through a pupil of said first optical system and an image conjugate, in said object space of the first optical system of at least one pixel of a sensor associated to said first optical system;
determining in the object space of the first optical system, an intersection of said first pixel beam with a plane; wherein said plane is located at a first distance from said pupil;
determining an image conjugate of said intersection through a second optical system; and
generating data representative of a second imaged pixel beam based on said image conjugate.

17. The computer program product according to claim 16 further comprising:
determining an intersection of said second imaged pixel beam with a sensor associated to the second optical system, and
integrating a light irradiance over said intersection of said pixel.

18. The computer program product according to claim 16, wherein the first optical system is an optical system of an actual camera and the second optical system is an optical system of a virtual camera.

19. The computer program product according to claim 16, wherein the first optical system is an optical system of a virtual camera and the second optical system is an optical system of an actual camera.

20. The method according to claim 2, further comprising integrating a light irradiance over said intersection.

21. The device according to claim 8, a light irradiance is integrated over said intersection.

22. The method of claim 1, wherein said method dos configured for rendering an image from said data.

* * * * *

UNITED STATES PATENT AND TRADEMARK OFFICE
CERTIFICATE OF CORRECTION

PATENT NO. : 11,092,820 B2
APPLICATION NO. : 16/313418
DATED : August 17, 2021
INVENTOR(S) : Blonde et al.

Page 1 of 1

It is certified that error appears in the above-identified patent and that said Letters Patent is hereby corrected as shown below:

In the Specification

Column 4 Line 63 Under BRIEF DESCRIPTION OF THE DRAWINGS, after "Figure 6 is a flow chart for explaining a process for encoding an image captured by the optical acquisition system according to an embodiment of the disclosure:", please add:
Figure 7 represents an image conjugate of a pixel beam through an optical system according to an embodiment of the invention.

Signed and Sealed this
Twenty-third Day of November, 2021

Drew Hirshfeld
*Performing the Functions and Duties of the
Under Secretary of Commerce for Intellectual Property and
Director of the United States Patent and Trademark Office*